(12) United States Patent
Sauska et al.

(10) Patent No.: US 7,042,147 B2
(45) Date of Patent: May 9, 2006

(54) SERPENTINE FLUORESCENT LAMP WITH SHAPED CORNERS PROVIDING UNIFORM BACKLIGHT ILLUMINATION FOR DISPLAYS

(75) Inventors: Christian Sauska, Orange, CT (US); Arpad Pirovic, Woodbridge, CT (US)

(73) Assignee: LCD Lighting, Inc., Orange, CT (US)

( * ) Notice: Subject to any disclaimer, the term of this patent is extended or adjusted under 35 U.S.C. 154(b) by 0 days.

(21) Appl. No.: 10/448,938

(22) Filed: May 30, 2003

(65) Prior Publication Data

US 2004/0051454 A1    Mar. 18, 2004

Related U.S. Application Data

(63) Continuation-in-part of application No. 10/228,819, filed on Aug. 27, 2002, now Pat. No. 6,791,272.

(51) Int. Cl.
*H01J 13/46* (2006.01)

(52) U.S. Cl. ........................ 313/493; 313/573

(58) Field of Classification Search ................ 313/493, 313/634, 491, 494, 620, 621, 623, 624, 625, 313/573; 315/56, 64
See application file for complete search history.

(56) References Cited

U.S. PATENT DOCUMENTS

| | | | |
|---|---|---|---|
| 2,512,282 A | 6/1950 | MacGregor | |
| 4,288,239 A | 9/1981 | Hoeh | |
| 4,300,073 A | 11/1981 | Skwirut et al. | |
| 4,319,162 A | 3/1982 | Hoeh | |
| 4,337,414 A | 6/1982 | Young | |
| 4,417,172 A | 11/1983 | Touhou et al. | |
| 4,481,442 A * | 11/1984 | Albrecht et al. | 313/493 |
| 4,743,799 A * | 5/1988 | Loy | 313/493 |
| 4,767,193 A | 8/1988 | Ota et al. | |
| 4,772,819 A | 9/1988 | Ridders | |
| 4,871,944 A | 10/1989 | Skwirut et al. | |
| 5,256,935 A | 10/1993 | Dobashi et al. | |
| 5,441,774 A | 8/1995 | Dutta et al. | |

(Continued)

FOREIGN PATENT DOCUMENTS

EP    0 274 269 A1    7/1988

(Continued)

OTHER PUBLICATIONS

Mercer et al, Fluorescent backlights for LCDs, Nov. 1989, Information Display, No. 11, pp. 8-13.

*Primary Examiner*—Ashok Patel
(74) *Attorney, Agent, or Firm*—Fattibene & Fattibene; Paul A. Fattibene; Arthur T. Fattibene

(57) ABSTRACT

A bent fluorescent lamp for backlighting a display providing uniform illumination. A fluorescent lamp is made from a tubular glass envelope having right angles formed therein with shaped corners. The right angles provide improved illumination of a plane surface for backlighting a liquid crystal display. The right angles and shaped corners eliminate dark regions in the illuminated surface. A right-angled bend is also formed at the ends of the fluorescent lamp. An electrode is positioned sufficiently far from a central portion of the lamp so that any dark spaces in the gas discharge of the fluorescent lamp, such as the Faraday dark space associated with a cathode of a lamp are not formed within the central portion.

12 Claims, 8 Drawing Sheets

U.S. PATENT DOCUMENTS

| | | | |
|---|---|---|---|
| 5,446,340 A * | 8/1995 | Parillo et al. | 313/493 |
| 5,536,999 A | 7/1996 | Winsor | |
| 5,635,794 A | 6/1997 | Koerfer | |
| 5,791,770 A | 8/1998 | Hoyt et al. | |
| 5,818,164 A | 10/1998 | Winsor | |
| 5,903,096 A | 5/1999 | Winsor | |
| 6,486,598 B1 * | 11/2002 | Tsai et al. | 313/493 |

FOREIGN PATENT DOCUMENTS

| | | |
|---|---|---|
| EP | 0 281 079 A2 | 9/1988 |
| JP | 01 081 159 | 3/1989 |
| JP | 2002 093 230 | 3/2002 |
| WO | WO 95/12964 | 5/1995 |

* cited by examiner

SERPENTINE FLUORESCENT LAMP WITH SHAPED CORNERS PROVIDING UNIFORM BACKLIGHT ILLUMINATION FOR DISPLAYS

RELATED APPLICATION

This is a continuation-in-part application of application Ser. No. 10/228,819 filed Aug. 27, 2002 now U.S. Pat. No. 6,791,272, which is herein incorporated by reference.

FIELD OF THE INVENTION

The present invention relates in general to fluorescent lamps used to illuminate a display, and more particularly to a fluorescent lamp having a shaped corner or bent portion providing more uniform illumination to backlight a display.

BACKGROUND OF THE INVENTION

Tubular fluorescent lamps are often used to back light or illuminate a display, such as a liquid crystal display. The fluorescent lamps are usually bent or curved forming a serpentine shape with rounded bends. The bends or curves in the tubular fluorescent lamps have a radius curve. These curves often prevent an adjacent display from being uniformly illuminated. As a result, often portions of the display appear darker than other portions of the display. These dark regions are often in corners of a quadrilateral, rectangular, or square display. These dark regions are undesirable and often lead to the display being less legible or difficult to read.

Additionally, there are dark spaces associated with gas discharge lamps, such as fluorescent lamps. There are several dark spaces adjacent the cathode of a gas discharge lamp. One of these spaces is the Aston dark space. This dark space is a space of unexcited atoms which occurs because the electrons leaving the electrode have less energy than that necessary to produce excitation of the atoms or molecules with which they collide. There are additional dark spaces a predetermined distance from the cathode, such as the Crookes dark space and the Faraday dark space. The Faraday dark space is typically furthest from the electrode. After the Faraday dark space a positive column is formed generating substantially uniform brightness over the remaining length of the tubular gas discharge lamp. The anode also has a dark space associated therewith. Accordingly, the illumination intensity or brightness along the length of a fluorescent tube gas discharge lamp is not uniform. This non-uniformity of illumination or brightens, when used to back light a display, causes difficulty in reading the display and interpreting information contained thereon. This is particularly disadvantageous in critical applications, such as those used in instrumentation, for example in avionics. In avionics, it is critical for features displayed to have a visibility as intended over the entire surface and not to be affected by dark regions of the back light illumination. Improperly backlighting the display or providing a back light that is not uniform in intensity may cause such hazardous results as a misreading of the display. Accordingly, it is essential that in backlighting of displays, especially in avionics or critical applications, that the backlighting illumination intensity be as uniform as possible over the entire planar surface of the display. The displays are often quadrilateral or rectangular, making it difficult to uniformly illuminate the corners of the quadrilateral or rectangular display using existing curved serpentine type gas discharge fluorescent tubes.

SUMMARY OF THE INVENTION

The present invention provides a fluorescent lamp having substantially improved uniform brightness or intensity along the length of the lamp. One embodiment of the present invention has an angled leg having an electrode placed therein. The electrode is spaced a predetermined distance from a central portion of the tubular envelope of the fluorescent lamp so as to be beyond the dark spaces in the gas discharge of the fluorescent lamp.

In another embodiment of the present invention, right angled bends are formed in the fluorescent lamp so as to more uniformly illuminate a square or rectangular display eliminating dark regions over portions of the display.

Another embodiment of the present invention is a method of making right angled bend in a tubular fluorescent lamp.

Accordingly, it is an object of the present invention to provide a fluorescent lamp capable of providing a substantially uniform back light illumination for a display.

It is an advantage of the present invention that dark regions over portions of a display are prevented.

It is a further advantage of the present invention that a display may more easily be read and information thereon displayed more accurately.

It is a feature of the present invention that the electrode in a gas discharge fluorescent lamp is spaced within a right angled bend of a leg of the gas discharge fluorescent lamp a predetermined distance so as to be beyond any dark spaces in the discharge of the lamp.

These and other objects, advantages and features will become readily apparent in view of the following more detailed description.

DETAILED DESCRIPTION OF THE PREFERRED EMBODIMENTS

Figure 1:
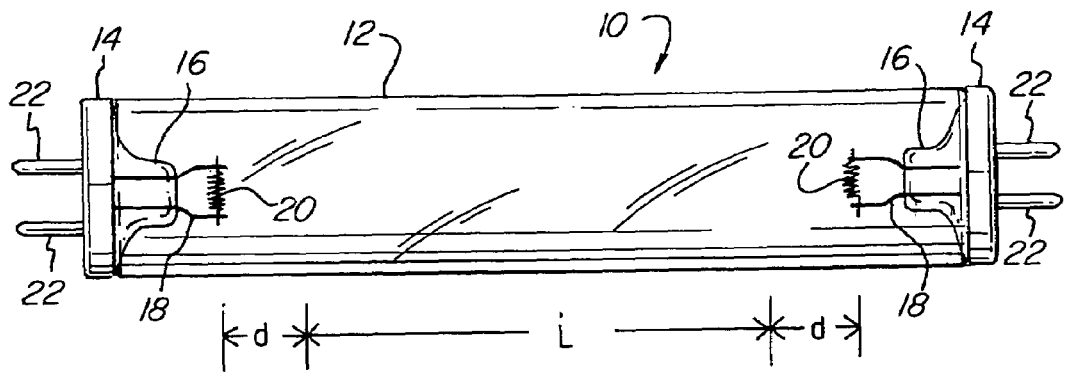
FIG. 1 schematically illustrates a prior art tubular fluorescent lamp.

FIG. 1 schematically illustrates a conventional or prior art tubular gas discharge fluorescent lamp. The fluorescent lamp 10 has a tubular glass envelope 12 and end caps 14 on either end. Stems 16 are formed for holding lead wires 18. Between lead wires 18 are filaments 20. Electrically coupled to the lead wires 18 are contact pins 22. The filaments or electrodes 20 act as either a cathode or anode in the gas discharge fluorescent lamp 10. Between the filaments 20, gas is ionized, causing a discharge. Often, the emitted wavelength of light is in the ultraviolet region, which is not visible. In a fluorescent lamp, a phosphor or fluorescent coating on the glass envelope 12 generates electromagnetic radiation in the visible spectrum when excited by ultraviolet radiation. Accordingly, the fluorescent lamp 10 is caused to radiate electromagnetic radiation in the visible spectrum generating light.

Fluorescent lamps are often used to backlight liquid crystal displays for use in instrumentation or other applications. However, dark spaces are often associated adjacent the electrode 20. The dark spaces generally occur a distance d from the electrodes 20. Therefore, substantial uniform illumination occurs along a longitudinal or axial length i of the fluorescent lamp 10. The non-uniform illumination or brightness along the length of the lamp in most applications is not troublesome. However, when the fluorescent lamp is used to backlight a display, the non-uniform illumination results in uneven illumination of the display causing dark regions.

Figure 1A:
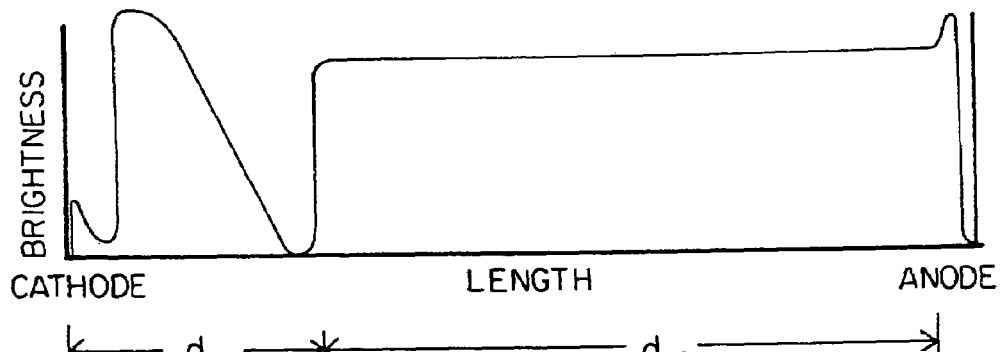
FIG. 1A graphically illustrates the variations in brightness or intensity along the longitudinal length of a tubular fluorescent lamp.

FIG. 1A graphically illustrates the brightness or illumination intensity along the longitudinal length of a conventional or typical fluorescent lamp. As can readily be seen, bands of dark spaces or uneven illumination occur along a length $d_{ds}$ adjacent the cathode. Uneven illumination also occurs adjacent the anode. However, at a distance from the anode or cathode, the brightness or intensity is substantially constant or uniform. The uniform illumination occurs along a positive column in the gas discharge for a distance $d_{pc}$.

Figure 2:
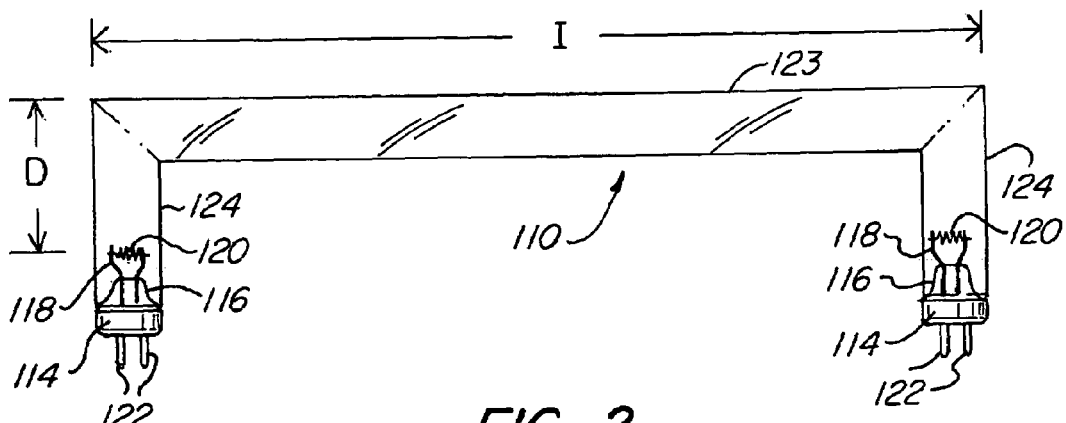
FIG. 2 schematically illustrates the application of the present invention to a tubular fluorescent lamp.

FIG. 2 illustrates an embodiment of the present invention capable of providing substantially uniform illumination or brightness over linear or longitudinal length I of a fluorescent lamp. Fluorescent lamp 110 comprises a linear central portion 123 and right angle bend legs 124 on each end of the linear central portion 123. The legs 124 form substantially a 90° or right angle with the central portion 123. On the ends of the tubular legs 124 are placed end caps 114. A relatively short stem 116 is positioned adjacent the end caps 114 and hold lead wires 118. The stem or mount 116 is relatively short. Placed between the lead wires 118 are filaments or electrodes 120. The electrodes 120 may be any conventional electrode used in a fluorescent lamp, including a coiled filament having an emission material thereon. The electrode 120 is formed a predetermined distance D from the end or furthest surface of the tubular central portion 123. This predetermined distance D is established such that any dark spaces, including the Faraday dark space associated with the cathode, occurs within the predetermined distance D. As a result, a positive column discharge resulting in a substantially uniform brightness or intensity extends the entire axial length I of the tubular central portion 123. The axial length I extends between the legs 124.

This fluorescent lamp structure has the benefit of providing a substantially constant brightness or illumination along the longitudinal length I. This makes possible more uniform illumination of backlit displays, as well as making the display housing more compact.

Figure 3:
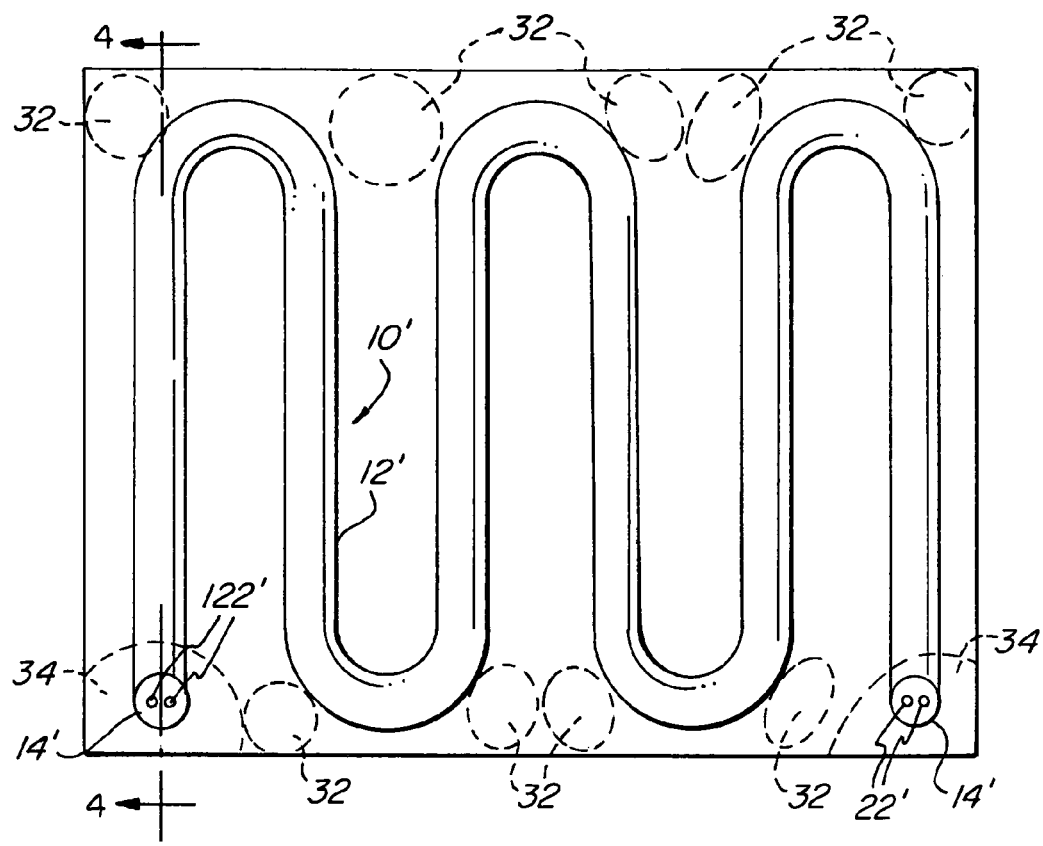
FIG. 3 schematically illustrates a rectangular display of the prior art using a serpentine radius curved tubular fluorescent lamp.

FIG. 3 schematically illustrates a conventional technique for backlighting a display. The conventional fluorescent lamp 110 is made from a glass envelope 12' formed in a curved or serpentine shape with curved portions having relatively rounded ends also with a curved radius. As a result of the curved portions, dark regions 32 are formed in the corners as well as adjacent the curved portions. Additionally, dark regions 34 are formed adjacent the end caps 14' of the fluorescent lamp 10' due to the dark space associated with the electrodes of the gas discharge fluorescent lamp 10'. Contact pins 22' are formed on the end caps 14'.

Dark spots or regions are also formed adjacent the ends of the fluorescent lamp 10' due to a non-uniform distance the fluorescent lamp is from a surface.

Figure 4:
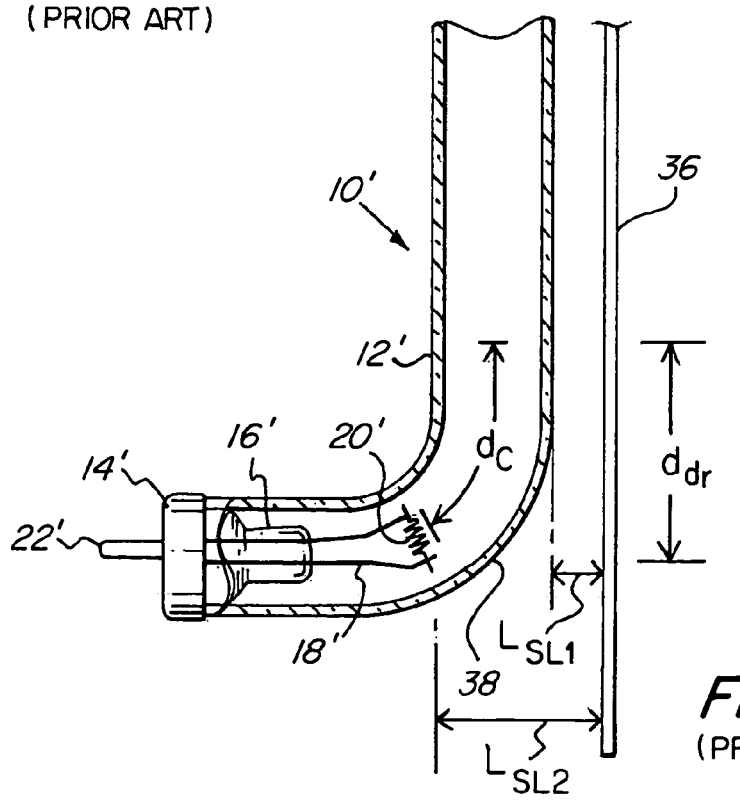
FIG. 4 is a cross section taken along line 4—4 in FIG. 3 and schematically illustrates a radius curved tubular fluorescent lamp utilized in the prior art and the location of dark spaces.

FIG. 4 more clearly illustrates this. FIG. 4 is a partial cross-section taken along line 4—4 in FIG. 3 and schematically illustrates a conventional or prior art curved ended fluorescent lamp 10'. The tubular glass envelope 12' has a curve 38 with a radius. The curve 38 causes the distance from a diffuser surface 36 to range from between $L_{SL1}$ and $L_{SL2}$. This varying distance causes non-uniform illumination of the diffuser surface 36, resulting in dark spots or regions. These dark spots or regions result in a display, adjacent the diffuser surface, from being uniformly backlit. Non-uniform illumination is also associated with the various dark spaces, such as the Aston dark space, the Crookes dark space, and the Faraday dark space associated with the cathode of a gas discharge lamp. These dark spaces extend a distance from the electrode or cathode 20' a distance $d_c$. As a result, the dark regions may extend a distance $d_{dr}$ along the diffuser surface 36.

FIG. 4 illustrates the conventional lamp structure having an electrode 20' between the lead wires 18' which are held by a relatively long stem or mount 16'. End cap 14' holds the contact pin 22' electrically coupled to the lead wires 18'. As a result of this conventional or prior art lamp structure, a dark region is formed along a dark region distance $d_{dr}$. This dark region distance $d_{dr}$ is caused by the curve 38 in the tubular glass envelope 12', as well as the dark spaces formed adjacent the cathode or electrode 20' that extend a cathode distance $d_c$.

Figure 5:
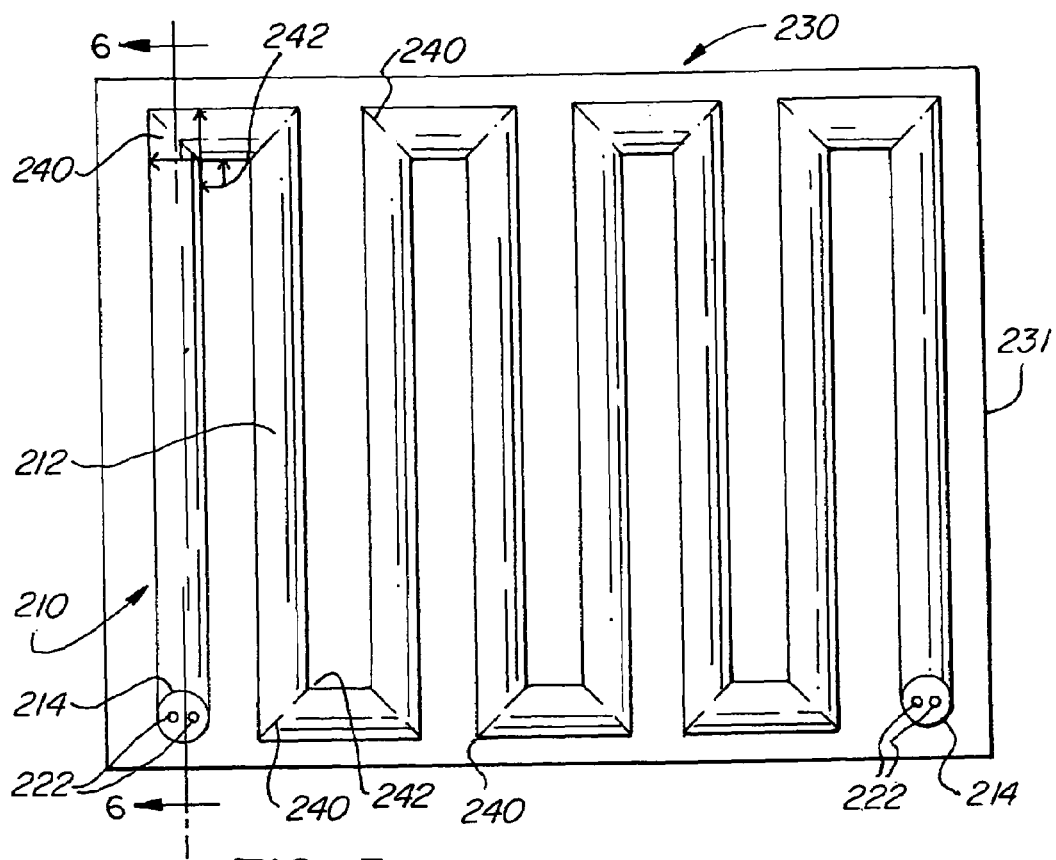
FIG. 5 is an elevational view schematically illustrating the right angled bends utilized in the fluorescent lamp of the present invention.

FIG. 5 schematically illustrates an embodiment of the present invention providing more uniform illumination to a display. The display illuminator 230 comprises a fluorescent lamp 210 having a glass tube or envelope 212 formed with right angles. The outside corners or bends 240 of the glass envelope 212 are formed with right angles. The inside corners or bends 242 are similarly formed with right angles. These right angled bends or corners prevent dark regions from being formed and provide a more uniform illumination. End caps 214 having contact pins 222 are formed in the ends of the glass envelope 212. The ends of the fluorescent lamp 210 are also formed with right-angled corners or bends.

Figure 6:
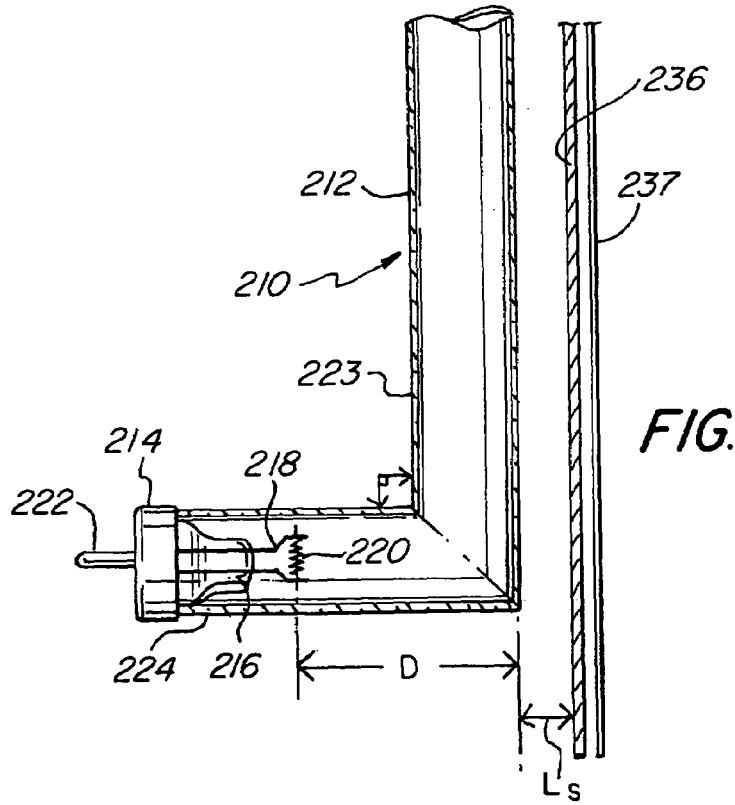
FIG. 6 is a cross section schematically illustrating the positioning of an electrode and the right angled bend in leg of a fluorescent lamp of the present invention taken along line 6—6 in FIG. 5.

FIG. 6 is a partial cross-section taken along line 6—6 in FIG. 5 and better illustrates the right-angled bend at the end of the fluorescent lamp 210. The tubular glass envelope 212 has a right-angle bend formed therein. The right-angled bend forms a leg 224 and a central portion 223. Due to this right-angled bend, the distance between a diffuser surface 236 and the central portion 223 is a surface distance $L_S$. This surface distance $L_S$ is a constant over the entire length of the central portion 223. This results in a more uniform illumination being provided to the diffuser surface 236 as a result of the constant distance $L_S$ therefrom. A liquid crystal display 237 is placed adjacent the diffuser surface 236.

Additionally, the leg 224 permits an electrode 220 to be spaced a predetermined distance D from the surface of the central portion 223 of the glass envelope 212. This predetermined distance D is made sufficiently long so that the predetermined distance D is greater than the distance of the Faraday dark spot from the electrode or cathode 220. This results in the Faraday dark spot not effecting the central portion 223, which provides substantially uniform illumination as a result.

To make the leg 224 as short as possible, a small or relatively short mount or stem 216 is used to hold the lead wires 218. On one end of the leg 224 is an end cap 214 through which contact pins 222 are electrically connected to the lead wires 218. The distance between the electrode 220 and the end cap 214 may be approximately 10 millimeters.

The Faraday dark space in a 40-watt fluorescent lamp may be approximately 3 to 5 centimeters from the electrode 220. Accordingly, the predetermined distance D may be approximately 5 centimeters or greater for a 40 watt fluorescent lamp. The positive column discharge over the length of the central portion 223 results in a substantially uniform brightness or intensity. Therefore, less dark spots or regions are formed. Depending upon the type of gas discharge fluorescent lamp, the location of the formation of the Faraday dark spaces may vary. Therefore, the distance D will vary depending upon the design of the fluorescent lamp. However, the location of the Faraday dark space for a particular lamp design is readily determined or may be easily measured by observation. The electrode or cathode 220 need only be positioned within the leg 224 such that the Faraday dark space is formed within the leg 224 and not within the central portion 223.

Figure 7:
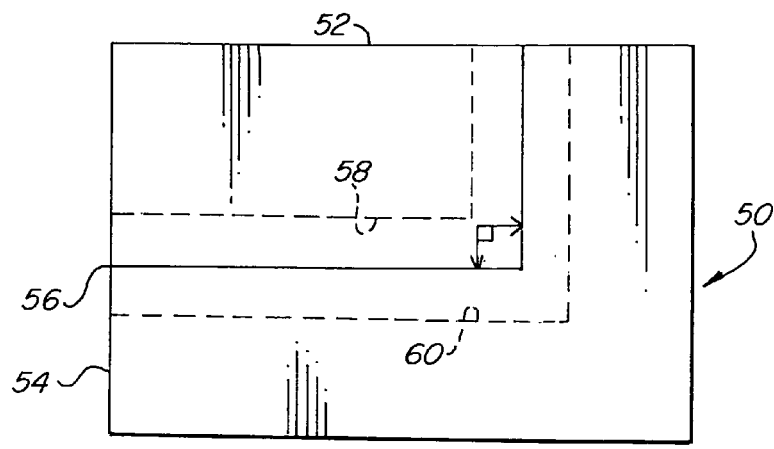
FIG. 7 is an elevational view schematically illustrating a mold utilized in the manufacture of a tubular fluorescent lamp having a right angled bend.

FIG. 7 is a side elevational view schematically illustrating a mold used to make the right angled bends in the glass envelopes or tubes illustrated in FIGS. 2, 5, and 6. The mold 50 has an upper mold portion 52 and a lower mold portion 54. A mold seam 56 divides the upper mold portion 52 and the lower mold portion 54. Formed within the upper mold portion 52 is a upper cavity 58. Formed within the lower mold portion 54 is a lower cavity 60. The upper cavity 58 and the lower cavity 60 mate to form a tube portion with a right angle bend.

Figure 8:
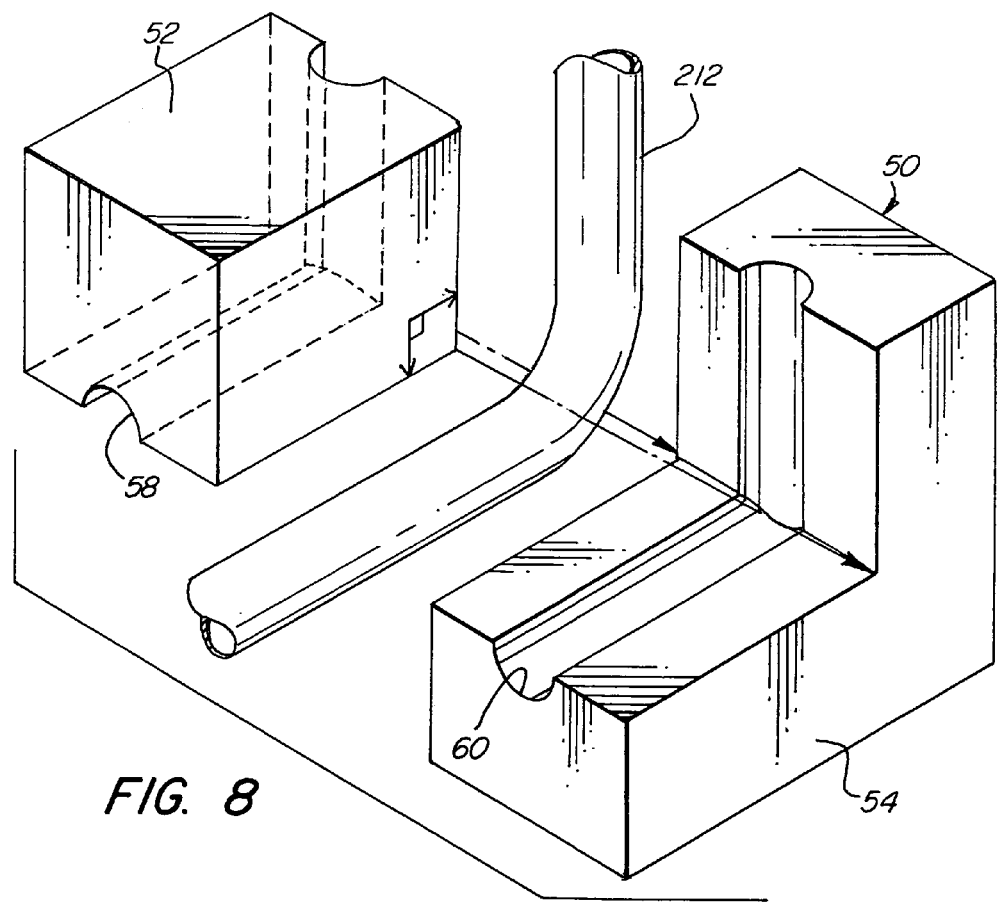
FIG. 8 is a perspective view of a mold for making a right angled bend in a tube used in a fluorescent lamp.

FIG. 8 is a perspective view illustrating the mold utilized in forming the tubular glass envelope 212 used in making the fluorescent lamp of the present invention. The tubular glass envelope 212 is heated such that the glass is in a plastic state or sufficiently soft for placement within the lower cavity 60 of the lower mold 54. When the tube 212 is placed in the lower cavity 60, it takes a generally L shape, conforming to the lower mold portion 54. The upper mold portion 52 is lowered on the lower mold portion 54 such that the upper cavity 58 mates with the lower cavity 60. The soft or plastic glass envelope 212 is forced to conform to the upper and lower cavities 58 and 60. Once the upper mold portion and lower mold portion are secured together, one end of the tube 212 is closed and a gas or air is blown into the other end forcing the plastic or soft glass to take the shape of the upper and lower cavities 58 and 60, forming a right angled bend in the glass tube envelope 212. Multiple bends may be made to form a right-angled bend serpentine fluorescent lamp as illustrated in FIG. 5.

Mounts or stems may then be formed and placed on the glass envelope or tube 212 along with end caps and contact pins so as to form a fluorescent lamp having a right angled bend. The same molding process or steps may be utilized in forming all of the right-angled bends required in making the present invention.

Figure 9:
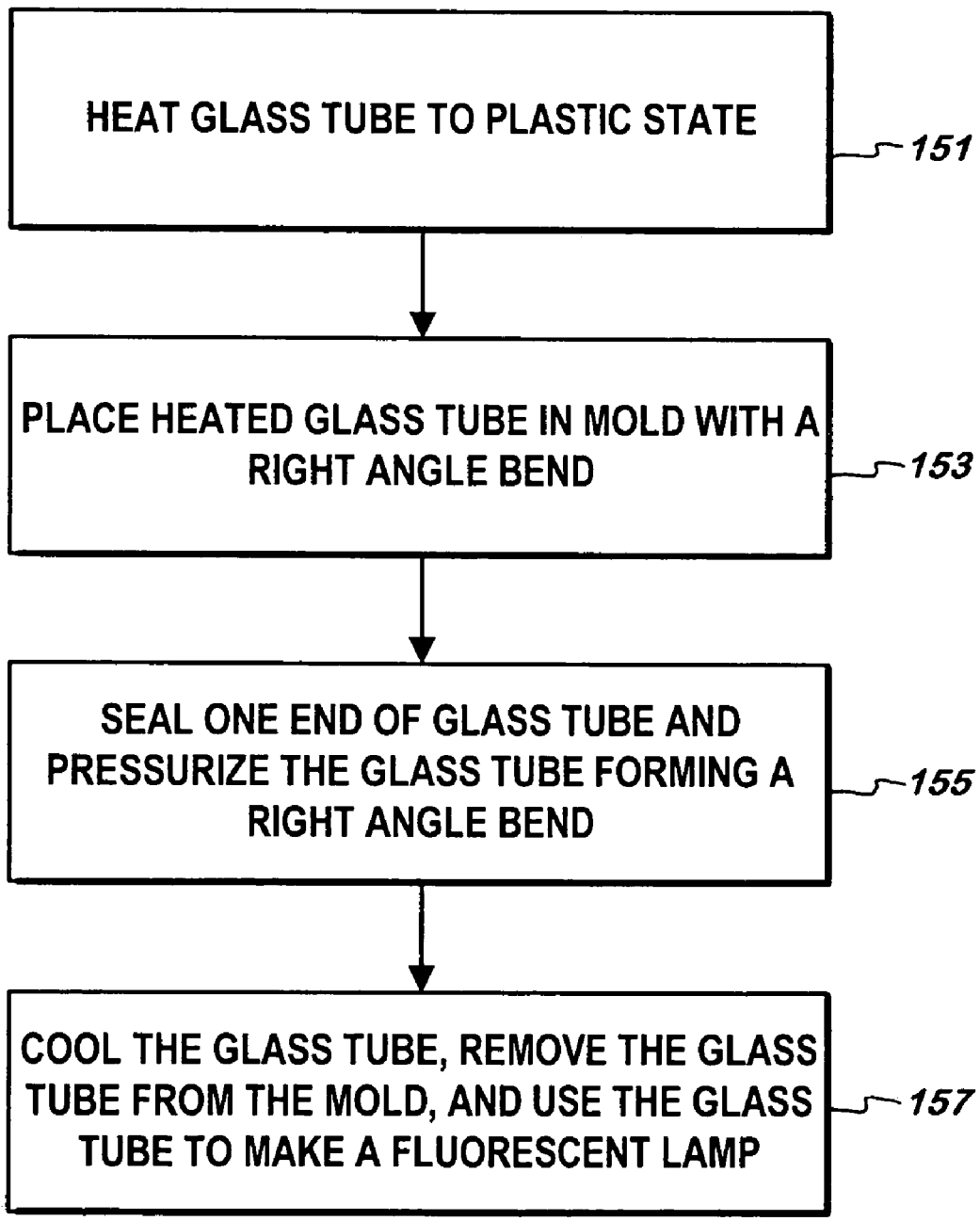
FIG. 9 is a block diagram illustrating the method steps for the manufacture of a tube used with a tubular fluorescent lamp having right angled bends.

FIG. 9 is a block diagram illustrating the method steps of this embodiment of the present invention. Box 151 represents the method step of heating the glass envelope or tube to a soft or plastic state. Box 153 represents the method step of placing the heated glass envelope or tube within a mold having a substantially right-angled or perpendicular bend. Box 155 represents the method step of sealing one end of the glass tube and pressurizing the glass tube with a gas or air so that the tube conforms to the shape of the mold. Box 157 represents the method step of cooling the glass tube, removing it from the mold, and forming a fluorescent lamp having a right angled bend therein.

Figure 10:
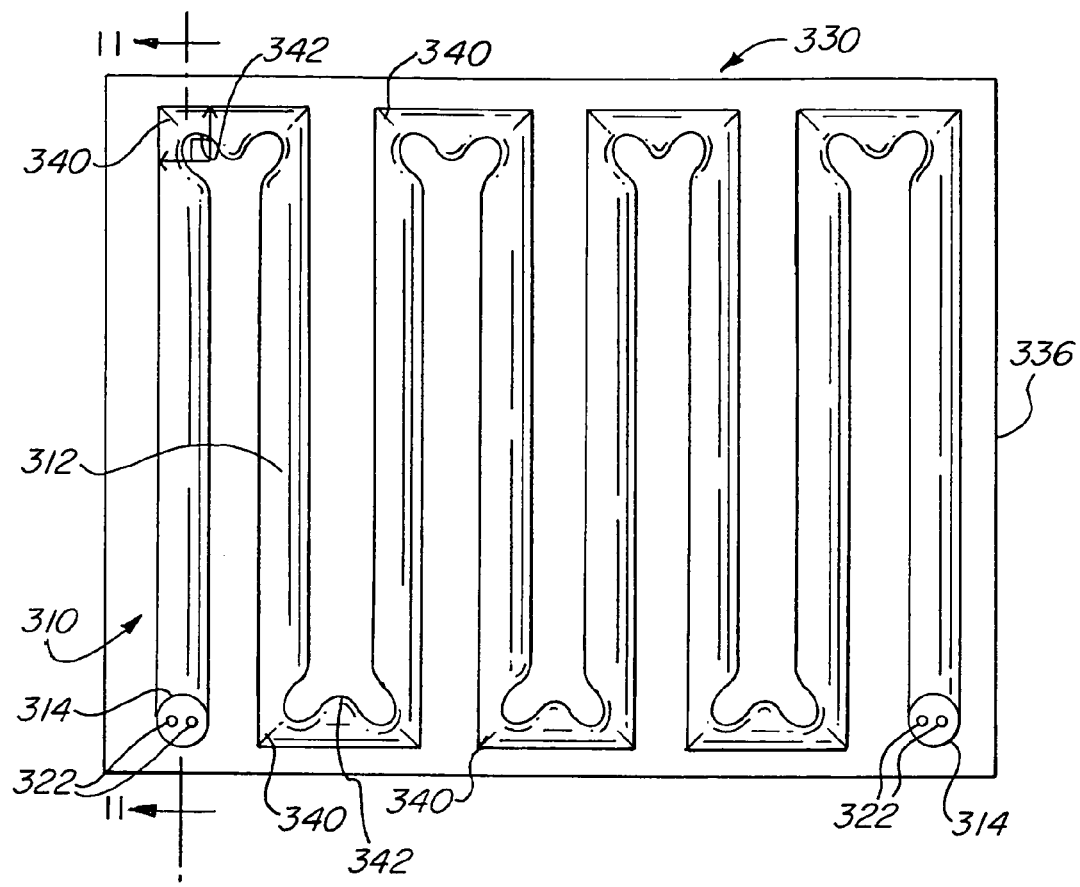
FIG. 10 is an elevational view schematically illustrating the right angled bends utilized in the fluorescent lamp of another embodiment of the present invention.

FIG. 10 schematically illustrates another embodiment of the present invention for providing uniform illumination to a display. The display illuminator 330 comprises a serpentine fluorescent lamp 310 having a glass envelope 312 formed with right angles. The right angles or 90° bends in the glass envelope 312 in this embodiment provides for a more uniform illumination and prevents dark spots at the corners or bends in the fluorescent lamp 310. The outside corners or bends 340 prevent dark regions from being formed. The inside corners or bends 342 have a keyhole or internal lobe shape so as to reduce the distance between the outside corner 340 and the inside corner 342 of the glass envelope 312. The dimension or distance between the outer corner or bend 340 and the inner corner or bend 342 is preferably equal to or less than the diameter or lateral dimension of the glass envelope 312 over the straight portion thereof having a constant lateral dimension. The bends or corners adjacent the end caps 314 and pins 322 may be similarly shaped. The reduced portion at the corners or bends of the lamp help provide a more uniform arc and current density within the fluorescent lamp 310, preventing non-uniform illumination or dart spots at the corners. This further enhances uniform illumination of a display.

Figure 11:
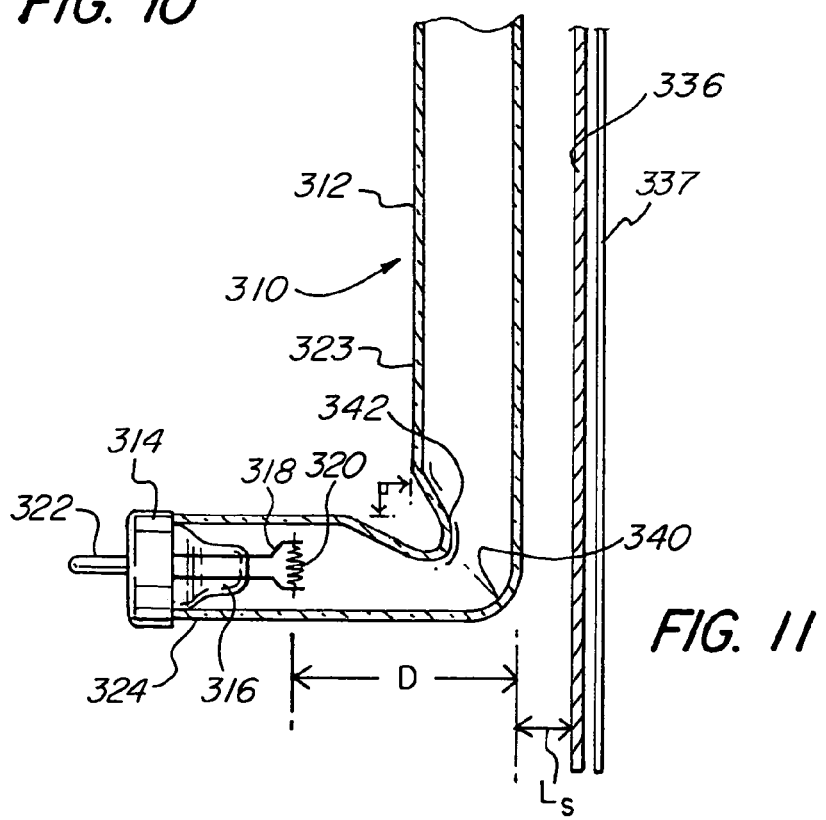
FIG. 11 is a cross section schematically illustrating the positioning of an electrode and the right angled bend in leg of a fluorescent lamp of another embodiment of the present invention taken along line 11—11 in FIG. 10.

FIG. 11 is a cross section taken along lines 11—11 in FIG. 10. FIG. 11 is similar to the embodiment illustrated in FIG. 6, but more clearly illustrates the outside corner or bend 340 and the inside corner or bend 342 in the embodiment illustrated in FIG. 11. The fluorescent lamp 310 is placed adjacent a diffuser 336 and an LCD or liquid crystal display 337. The outside corner or bend 340 permits a uniform distance $l_s$ between the diffuser 336 and the fluorescent lamp 310. This facilitates a more uniform illumination being provided to the liquid crystal display 337. Electrode 320 is held by a stem or mount 316 within a leg 324. At the end of the leg 324 is an end cap 314 and contact pins 322. The electrode 320 is connected to the pins 322 with lead wires 318. The electrode 320 is spaced a distance D from the end of the glass envelope 312. The inside corner or bend 342 extends inward to reduce the distance at the corner or bend between the inside corner or bend 342 and the outside corner or bend 340. A more uniform arc across section is thereby obtained within the fluorescent lamp 310 providing more uniform illumination with reduced dark spots.

Figure 12:
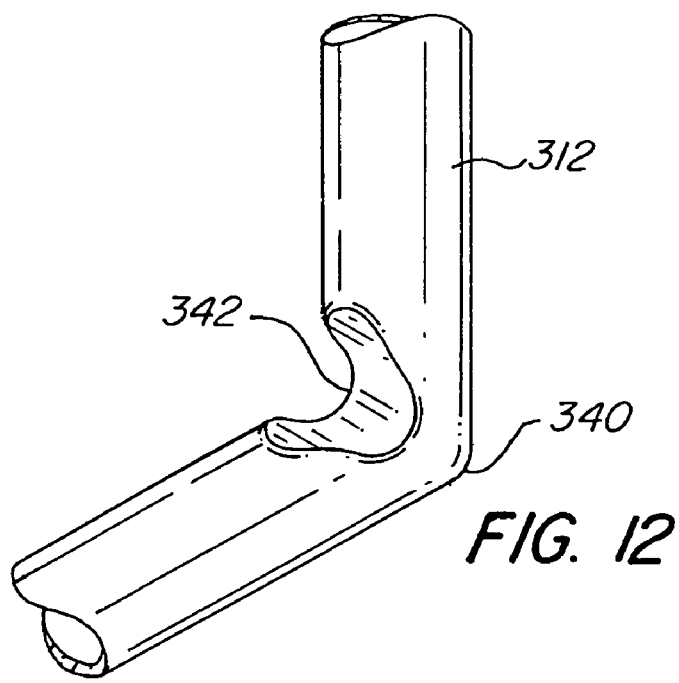
FIG. 12 is a perspective view illustrating the corner or bent portion of a portion of the fluorescent lamp of another embodiment of the present invention.

FIG. 12 is a perspective view of a portion of a fluorescent lamp as illustrated in FIGS. 10 and 11, more clearly illustrating the inside corner or bend 342. The glass envelope 312, forming the fluorescent lamp, has a relatively sharp outside corner or bend 340. The inside corner or bend 342 is shaped so as to reduce the dimension or distance between exterior walls of the glass envelope 312 at the corners.

Figure 13:
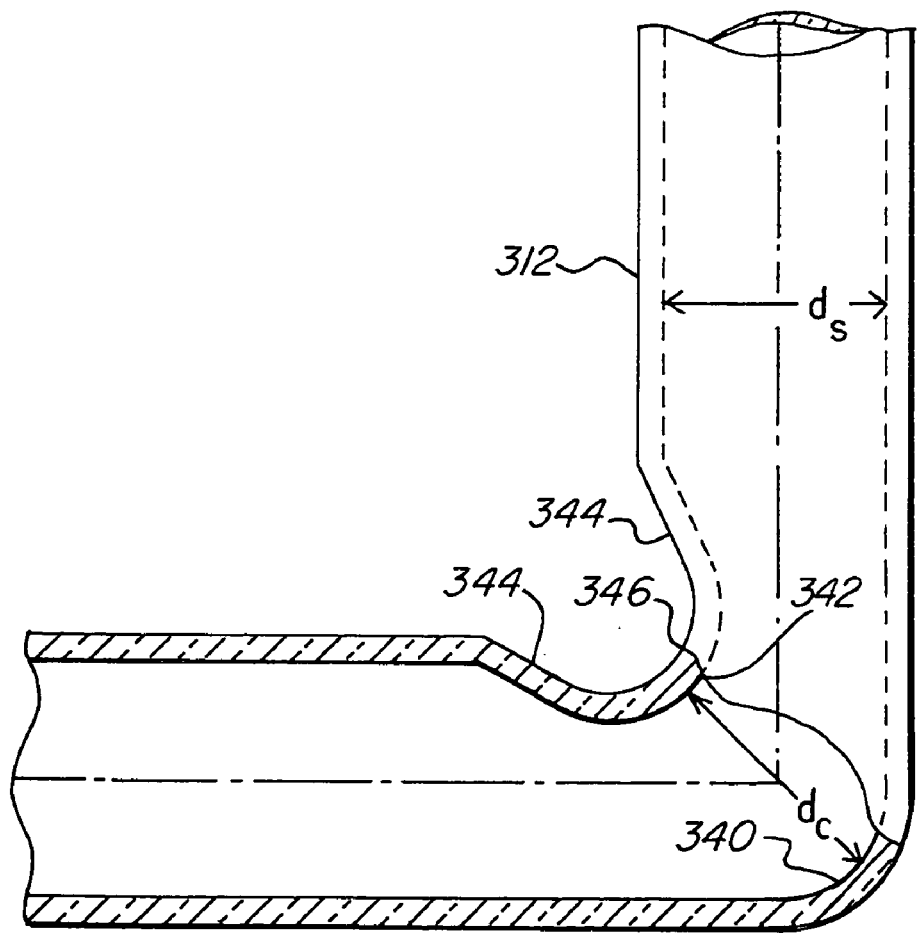
FIG. 13 is a cross section of a corner or bent portion illustrating the lateral dimensions of the embodiment of the present invention illustrated in FIG. 12.

FIG. 13 more clearly illustrates the bend at a corner of the glass envelope 312. The bends at the corners of the serpentine glass envelope 312 are made so that the distance $d_c$ is less than or equal to the distance $d_S$ between the substantially parallel surfaces of the glass envelope 312 at a straight section. This helps maintain a more uniform arc and results in more uniform illumination, preventing dark spots. The outside corner or bend 340 is relatively sharp with a slight radius. The inside corner or bend 342 is formed from an inside curved portion 346 which may be a section of a circle or spherical and adjacent linear portions 344. The shape of the inside corner or bend 342 results in distance $d_c$ being less than would normally occur without the shaped inside corner or bend 342. The arc or current density is maintained substantially more uniform by making distance dc equal to or less than distance $d_c$. This results in improved more uniform illumination.

While in this embodiment it is preferred that all the corners or bends have the shape illustrated, not all of the corners or bends in a particular fluorescent lamp need to have this shape. However, the corner or bend having a reduced distance provides a more uniform interior transverse dimension so as to render more uniform the generated illumination. Accordingly, a fluorescent lamp made in accordance with the embodiment illustrated in FIGS. 10–13 provides improved, more uniform illumination for back lighting a liquid crystal display.

Figure 14:
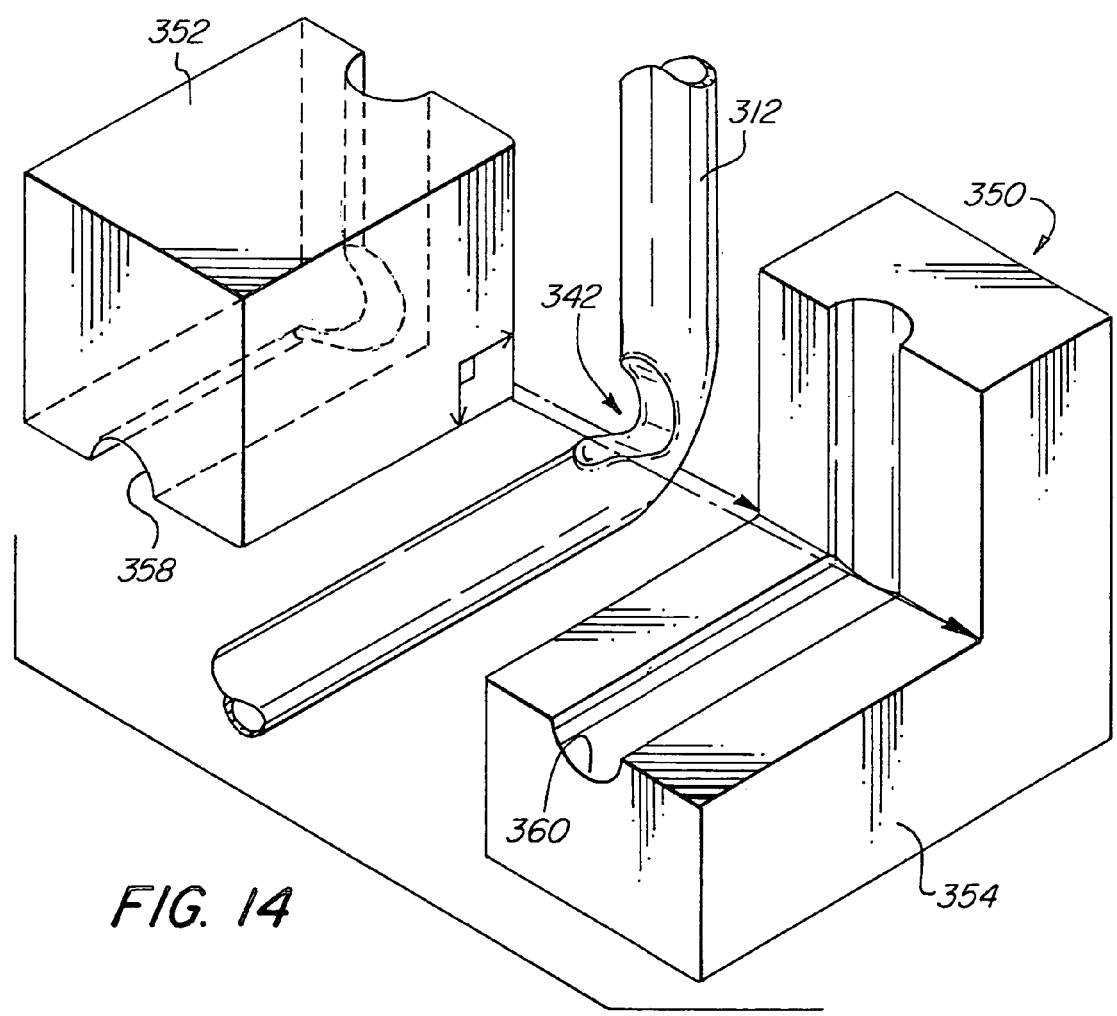
FIG. 14 is a perspective view of a mold for making a shaped right angled bend in a tube used in a fluorescent lamp in an embodiment of the present invention.

FIG. 14 is a perspective view illustrating a mold utilized in forming the glass envelope 312 in the embodiment illustrated in FIGS. 10–13. The mold 350 has an upper mold portion 352 and a lower mold portion 234. Formed within the upper mold portion 352 is an upper cavity 358 with a shaped corner mold portion 343. The lower mold portion 354 has lower cavity 360 formed therein. The upper cavity 358 and the lower cavity 360 mate to form a tube portion 312 with a right angled bend having a shaped corner 342. The shaped corner mold portion 343 results in the molded shaped corner 342 to have a lateral dimension between the inside and outside corner that is equal to or less than the lateral dimension at a straight or unbent section of the glass envelope 312.

Upon heating the glass envelope 312, the glass envelope 312 is placed in the mold 350 between the upper mold portion 352 and the lower mold portion 354. Upon closing the upper and lower mold portions 352 and 354, one end of the glass envelope is closed or sealed and air or other gas under pressure is used to cause the heated soft or plastic glass envelope 312 to conform to the shape of the mold 350 forming the shaped corner 342 in the glass envelope 312.

The present invention provides substantially improved uniform illumination for backlighting a liquid crystal display. The improved illumination is created by using right angled bends to prevent dark spots or regions, as well as positioning the electrode a sufficient distance from the illuminating portion of the fluorescent lamp so that it is unaffected by dark spaces, including the Faraday dark space. This makes possible substantially improved more uniform backlight illumination for a display.

While several embodiments have been illustrated and described, it should readily be appreciated by those skilled in the art that various modifications may be made without departing from the spirit and scope of this invention.

What is claimed is:

1. A fluorescent lamp for use in backlighting a display comprising:
    a glass tube having a central portion with a first lateral distance and a substantially right angled bend forming legs on each end of said glass tube, each of the substantially right angled bends having a second lateral distance between an outside corner and an inside corner of the substantially right angled bends, wherein said second lateral distance is equal to or less than the first lateral distance;
    a stem placed in each end of said glass tube; and
    an electrode placed on each said stem and held a predetermined distance from the central portion of said glass tube, wherein the predetermined distance is greater than a distance in which a dark space is formed upon operation of the fluorescent lamp,
    whereby a substantially uniform illumination is formed along the central portion of said glass tube.

2. A fluorescent lamp for use in backlighting a display as in claim 1 wherein:
    the dark space is a Faraday dark space.

3. A fluorescent lamp for use in backlighting a display as in claim 1 wherein:
    the central portion is straight.

4. A fluorescent lamp for use in backlighting a display as in claim 1 wherein:
    the central portion has a serpentine shape formed with a plurality of substantially right angled bends.

5. A fluorescent lamp for use in backlighting a display as in claim 1 wherein:
    the predetermined distance is greater than five centimeters.

6. A fluorescent lamp for use in backlighting a display as in claim 1 wherein:
    said stem and electrode have a combined length less than ten millimeters.

7. A fluorescent lamp for use in backlighting a display comprising:
    a tubular glass envelope having a first lateral dimension;
    a plurality of substantial right angled bends formed within said tubular glass envelope having straight sections, said plurality of substantially right angled bends having a shaped inside corner formed from a curved portion placed between a pair of linear portions angled from the straight sections and having a second lateral dimension between an outside corner and an inside corner, wherein the first lateral dimension is greater than or equal to the second lateral dimension;
    a leg formed on each end of said tubular glass envelope; and
    an electrode placed in the end of each leg.

8. A fluorescent lamp for use in backlighting a display as in claim 7 wherein:
    said electrode is positioned a predetermined distance from a central portion of the tubular glass envelope such that a dark space occurs within said leg and not within the central portion.

9. A fluorescent lamp for use in backlighting a display as in claim 8 wherein:
    the dark space is a Faraday dark space.

10. A fluorescent lamp for use in backlighting a display comprising:
- a tubular glass envelope having a first lateral dimension;
- a plurality of substantial right angled bends formed within said tubular glass envelope, said plurality of substantially right angled bends having a second lateral dimension between an outside corner and an inside corner, wherein the first lateral dimension is greater than or equal to the second lateral dimension;
- a leg formed on each end of said tubular glass envelope; and
- an electrode placed in the end of each leg, said electrode is positioned a predetermined distance from a central portion of the tubular glass envelope such that a dark space occurs within said leg and not within the central portion, wherein the predetermined distance is greater than five centimeters.

11. A fluorescent lamp for use in backlighting a liquid crystal display comprising:
- a tubular glass envelope having a substantially straight portion with a first lateral dimension;
- a plurality of substantial right angled bends formed within said tubular glass envelope, said plurality of substantially right angled bends having a shaped inside corner formed from a curved portion placed between a pair of linear portions angled from the substantially straight portion and having a second lateral dimension between an outside corner and the inside corner, wherein the first lateral dimension is greater than or equal to the second lateral dimension;
- a leg formed on each end of said tubular glass envelope; and
- an electrode placed in the end of each leg,
- whereby the shaped inside corner of the fluorescent lamp provides substantially uniform backlighting illumination to a liquid crystal display.

12. A fluorescent lamp for use in backlighting a display comprising:
- a glass tube having a central portion with a first lateral distance and a substantially right angled bend forming legs on each end of said glass tube, each of the substantially right angled bends having a second lateral distance between an outside corner and an inside corner of the substantially right angled bends, wherein said second lateral distance is equal to or less than the first lateral distance;
- a stem placed in each end of said glass tube; and
- an electrode placed on each said stem and held a predetermined distance from the central portion of said glass tube, wherein the predetermined distance is greater than a distance in which a dark space is formed upon operation of the fluorescent lamp;
- an end cap placed on each end of said glass tube;
- contact pins extending through a respective one of said end caps on each end of said glass tube and coupled to a respective one of said electrodes; and
- wherein the leg is only as long as it requires and said stem is sufficiently short so as to result in the dark space occurring within said leg during operation of the fluorescent lamp, and whereby a substantially uniform illumination is formed along the central portion of said glass tube.

* * * * *